United States Patent [19]

Lee

[11] Patent Number: 5,397,040

[45] Date of Patent: Mar. 14, 1995

[54] FISHING TACKLE WAIST BELT

[76] Inventor: Jeffrey S. Lee, 1591 Cascade St., West Covina, Calif. 91790

[21] Appl. No.: 230,785

[22] Filed: Apr. 21, 1994

[51] Int. Cl.⁶ .............................................. A45F 3/00
[52] U.S. Cl. .................................. 224/224; 224/901; 224/240; 206/315.11; 206/579
[58] Field of Search ................. 206/315.11, 579, 373, 206/813; 224/224, 225, 226, 227, 240, 920, 242, 252, 253, 901, 902, 904, 908; 383/39, 40, 38; 190/109; 43/54.1, 55, 57.1

[56] References Cited

U.S. PATENT DOCUMENTS

| | | | |
|---|---|---|---|
| 2,323,342 | 7/1943 | McManus et al. | 206/813 |
| 2,691,400 | 10/1954 | Glondano | 206/315.11 |
| 2,713,807 | 7/1955 | Herbert | 43/57.1 |
| 2,717,391 | 9/1955 | Bracken | 224/920 |
| 3,490,169 | 1/1970 | Tweed | 206/315.11 |
| 3,537,628 | 11/1970 | Thompson | 383/38 |
| 3,739,518 | 6/1973 | Ziegler | 206/315.11 |
| 4,139,096 | 2/1979 | Sieger | 343/54.1 |
| 4,212,377 | 7/1980 | Weinreb | 190/110 |
| 4,323,181 | 4/1982 | Spasoff | 224/253 |
| 4,545,414 | 10/1985 | Baum | 224/224 |
| 4,784,304 | 11/1988 | Schweitzer | 224/920 |
| 4,848,624 | 7/1989 | Clem | 224/222 |
| 5,005,679 | 4/1991 | Hjelle | 190/110 |
| 5,096,030 | 3/1992 | Espinosa et al. | 190/110 |
| 5,230,450 | 7/1993 | Mahvi et al. | 190/110 |

Primary Examiner—Henry J. Recla
Assistant Examiner—Gregory M. Vidovich

[57] ABSTRACT

A waist belt having a variety of individual storage compartments within a single fabric pack supported by the belt. Within the pack is a number of variously sized generally rigid containers fitted removably within top or upper fabric storage compartments of the pack for holding fishing gear. The rigid containers are retained within the fabric compartments with the use of hook and loop fasteners mating between the bottom of the rigid containers and the bottom of the fabric compartments. The top edges of the rigid containers slope downward away from the belt or wearer to provide improved access to items therein. Exposed lids of the rigid containers are hingidly attached to the containers, and open or swing away from the wearer of the belt. The lids additionally include markings for specific items such as hooks, lures, swivels, and weights which may be contained in individual designated compartments for quick access thereto. A large zippered fabric compartment is provided in the pack underneath the rigid containers, openable on the front exterior of the pack. On the outside of the fabric pack is a clear plastic compartment for insertion and display of a fishing license in plain view. Also provided is an exterior pocket for holding a hand tool such as pliers.

3 Claims, 7 Drawing Sheets

FISHING TACKLE WAIST BELT

BACKGROUND OF THE INVENTION

1. Field of the Invention

This invention relates to fishing equipment in general, and more precisely to a waist belt with attached fabric pack having fabric compartments retaining generally rigid containers for carrying fishing items such as hooks, sinkers, lures, flies and the like.

2. Description of the Prior Art

Shoreline fishermen have for many years faced the dilemma of how to carry the necessary fishing equipment while wading in the water, or walking along the shore and fishing. Most tackle boxes are not feasible for numerous reasons to carry out into the water, and running back and forth to the shore takes considerable time and can scare the fish, which is undesirable if the fish are biting. Basket type creels, while supported by an arm strap, are cumbersome, and excessive time is also required to search through and select individual items from the one large main creel compartment. Fishing vests provide smaller individual compartments, but the vests must be worn by the fishermen, which in warm weather can be disagreeable. Additionally, many of the compartments on fishing vests are difficult to access, being too close to the face and flat on the chest rendering it difficult to identify items therein and to quickly and conveniently acquire the item desired. Furthermore, vest compartments are typically of soft fabric which is subject to being snagged by individual hooks or hooks on lures or flies. Such soft flexible compartments by their very nature define deep rather tights cracks at the bottom which hide and render it difficult to retrieve small items such as sinkers, particularly small split-shot sinkers when stored in these vest pockets.

Belt mounted accessories for fishing tackle have also been offered. A belt-mounted fishing tackle carrier is taught in U.S. Pat. No. 4,323,181, issued to J. Spasoff on Apr. 6, 1982. The Spasoff device is a rigid plastic compartmentalized structure which is attachable to the fisherman's belt. One disadvantage of this tackle carrier is the limited number of compartments. The Spasoff device shows only three storage compartments which are specifically sized and structured for carrying bait. This greatly reduces or eliminates space for carrying lures and other necessary fishing tackle. While extension of the number of compartments could be provided, the rigidity of the device necessarily limits the number and size thereof due to the unfeasibility of attaching this device to the fisherman's belt. The Spasoff device also does not appear to provide any place to securely carry items such as a small container of liquid refreshments, a snack or lunch, or an extra reel or spool of line, all being items which a fisherman may wish to carry.

Therefore, there is a need in the field to provide the fisherman with a lightweight, comfortable, and quickly accessible fishing tackle storage device structured for storage of a wide variety of fishing equipment and other items the fisherman may wish to carry, and to store them in a manner which allows the fisherman to quickly retrieve the item desired.

SUMMARY OF THE INVENTION

The following detailed description is of a preferred arrangement of the invention, and although there are clearly some changes which could be made to that which is specifically herein described and shown in the included drawings, for the sake of briefness of this disclosure, all of these changes which fall within the scope of the present invention have not herein been detailed, but should be apparent to those skilled in the art. The present invention is a waist belt having a variety of individual storage compartments within a single fabric waist pack. The fabric of the pack is lightweight, durable and preferably water repellant. Within the pack is a number of variously sized generally rigid containers fitted removably within some of the fabric storage compartments for holding fishing gear, and for protecting the fabric compartments from hook-snags and excessive wear from sinkers and the like. The rigid containers also define an open or non-collapsed area from which small items stored therein may be easily retrieved with the fingers. The rigid or semi-rigid containers are retained within the fabric compartments with the use of hook and loop fasteners mating between the bottom of the rigid containers and the bottom of the fabric compartments, an arrangement which allows the removal of the rigid containers from the fabric pack when desired, such as for restocking, but prevents the inadvertent falling out of the containers from the pack should the wearer bend over, while at the same time leaving the lid covered tops of the containers exposed in the pack for easy access thereto during fishing. The top edges of the rigid containers slope downward away from the belt or wearer to provide improved viewing of and access to items therein. The exposed lids of the rigid containers are hingidly attached to the containers, and open or swing away from the wearer of the belt, again to provide improved access to items therein. The lids additionally include markings for specific items such as hooks, lures, swivels, and weights for example, which may be contained in the individual designated compartments for quick and easy access thereto. A large zippered fabric compartment is provided in the pack underneath the rigid containers, openable on the front exterior of the pack. On the outside of the fabric pack is a clear vinyl pocket or compartment for insertion and display of a fishing license in plain view for inspection by a game warden, which the display of the fishing license on the body is now required under law in several states. Also provided is an exterior pocket for holding a hand tool for removing hooks from the mouth's of fish or for cutting fishing line, such as a pair of pliers.

The present invention is to be worn around the fisherman's waist, with the pack and its compartments facing forward, centered in front of the fisherman. Since the pack section of the invention faces forward and its weight is generally centered on the wearer, and it is generally made of pliable form fitting materials (fabric), it is comfortable to wear and very convenient to use.

These, as well as other advantages of the invention will be better understood from a reading of the remaining specification and claims, and from a study of the appended drawings.

DESCRIPTION OF THE PREFERRED EMBODIMENT

Figure 1:
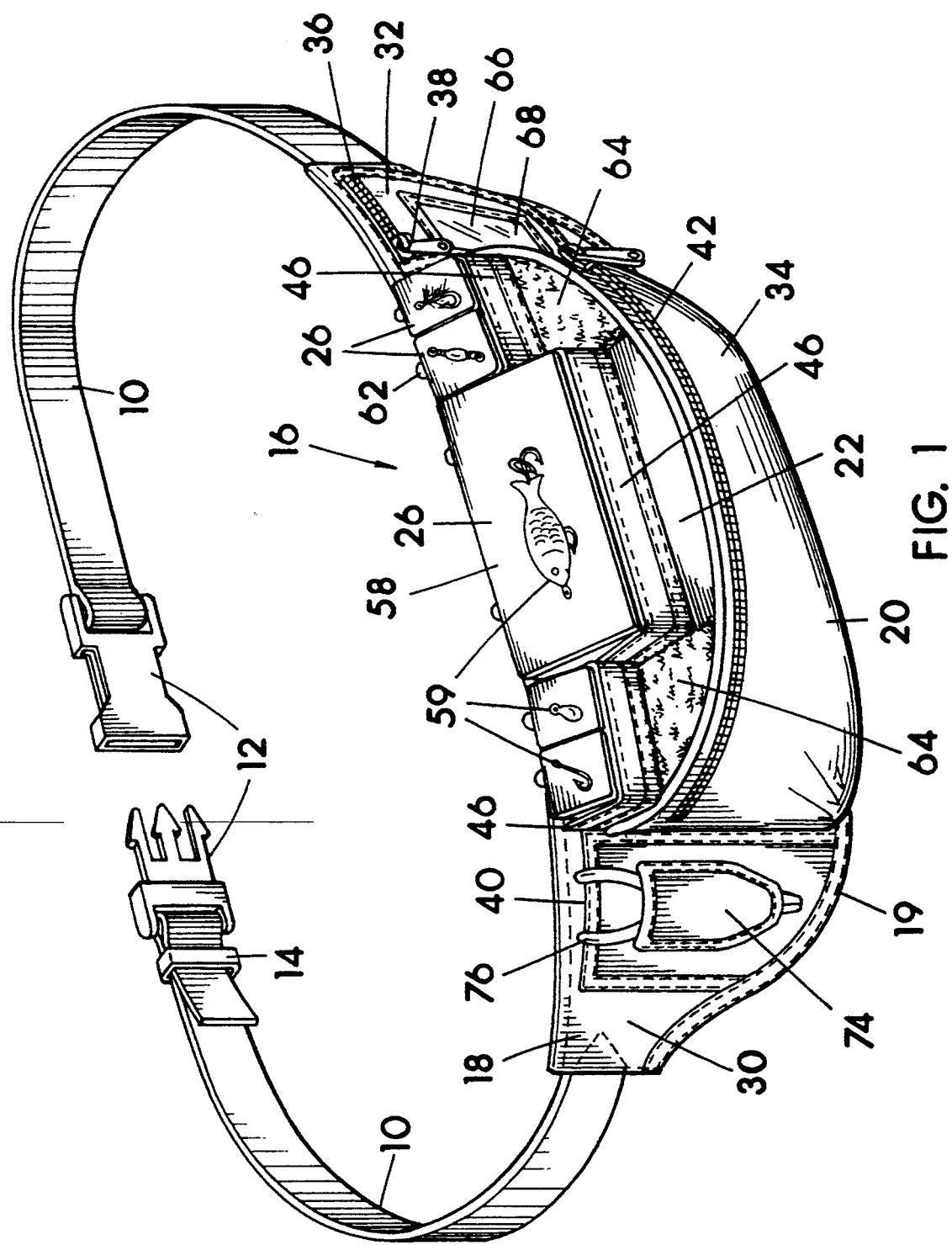
FIG. 1 is a top perspective view of a preferred embodiment of the present invention.
Figure 2:
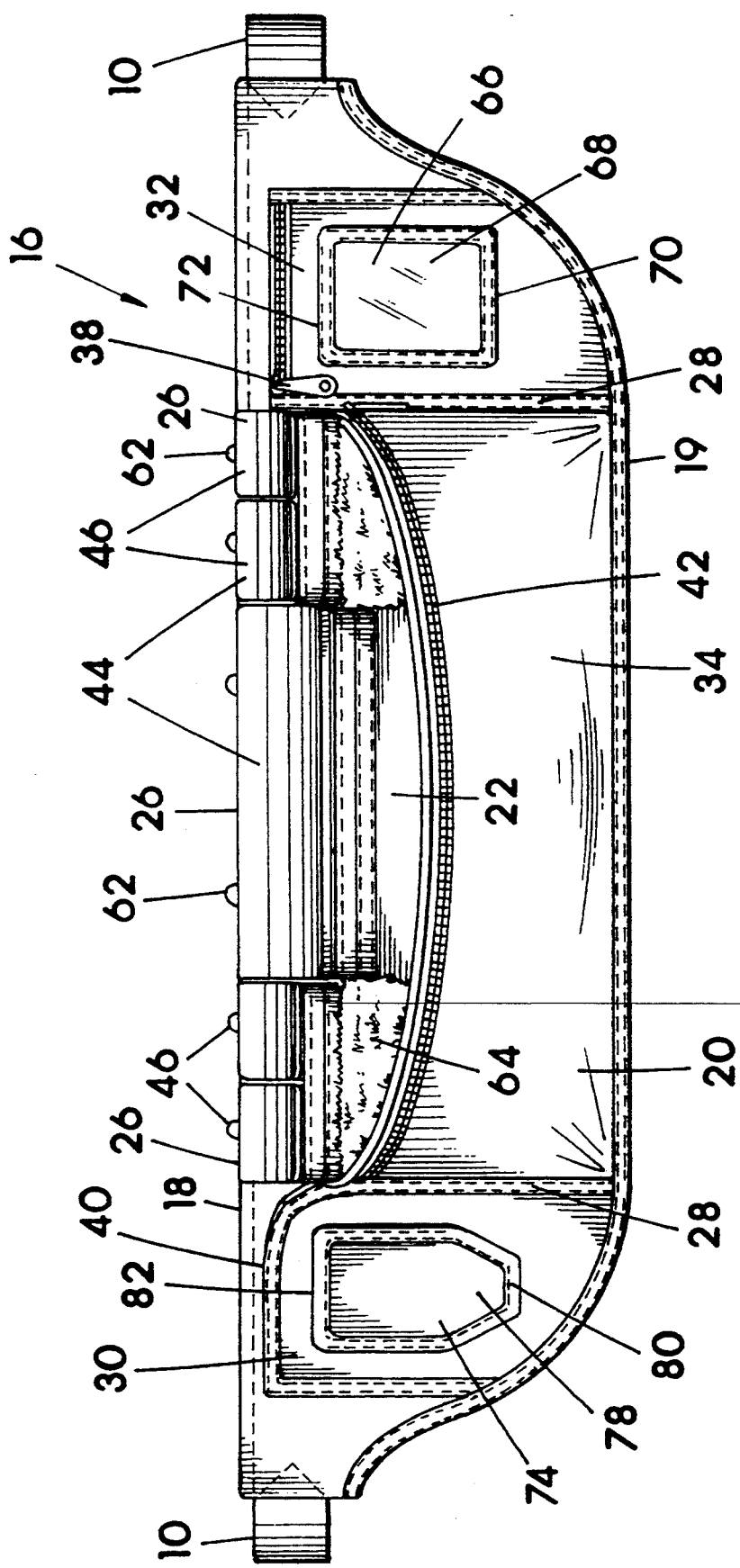
FIG. 2 is a front view of the pack of the preferred embodiment.
Figure 3:
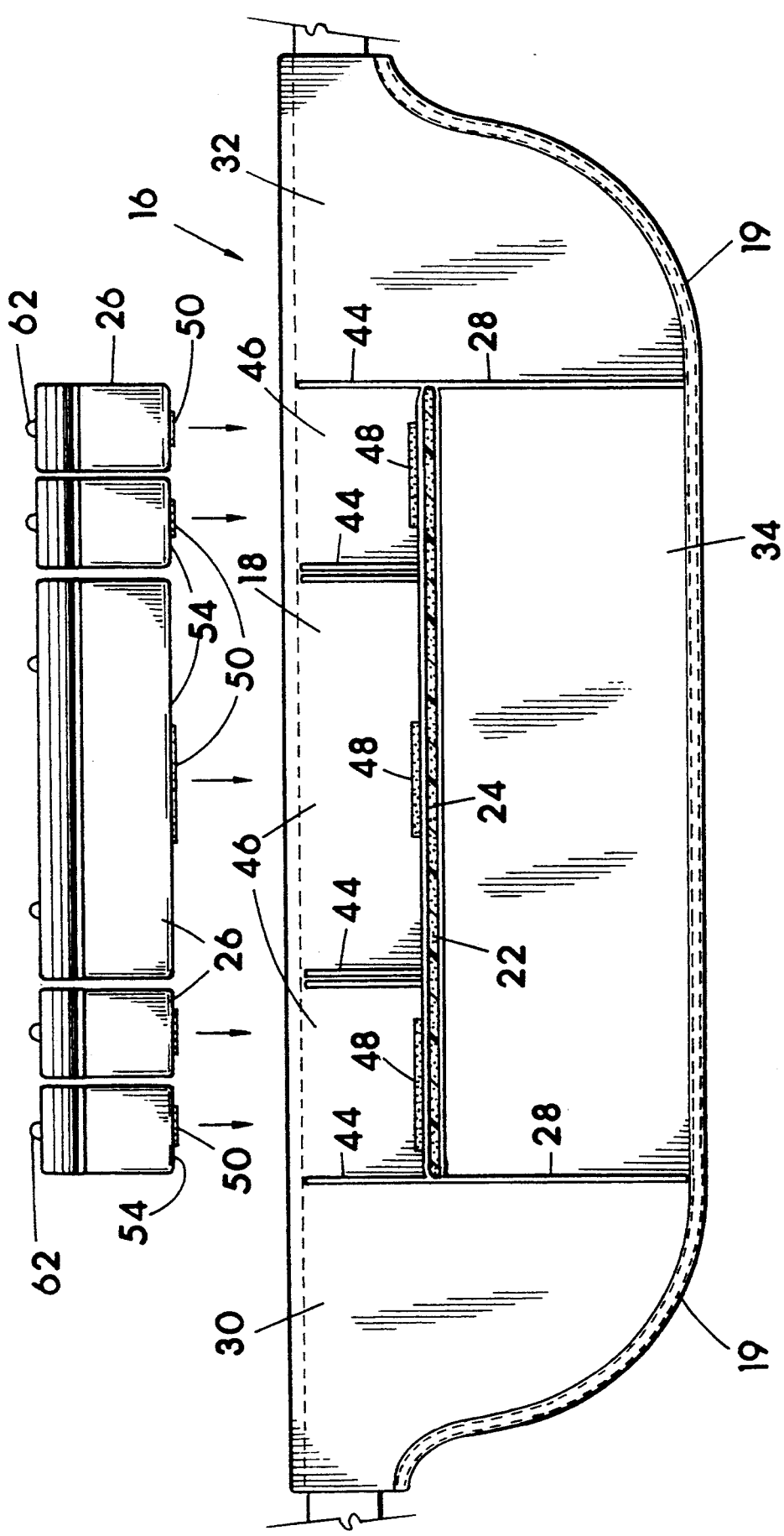
FIG. 3 is a cross sectional view of the pack illustrating the rigid containers positioned above and ready for insertion into the upper compartments of the pack. Additionally shown is hook and loop fasteners on the bottom of the containers and in the bottoms of the compartments.
Figure 4:
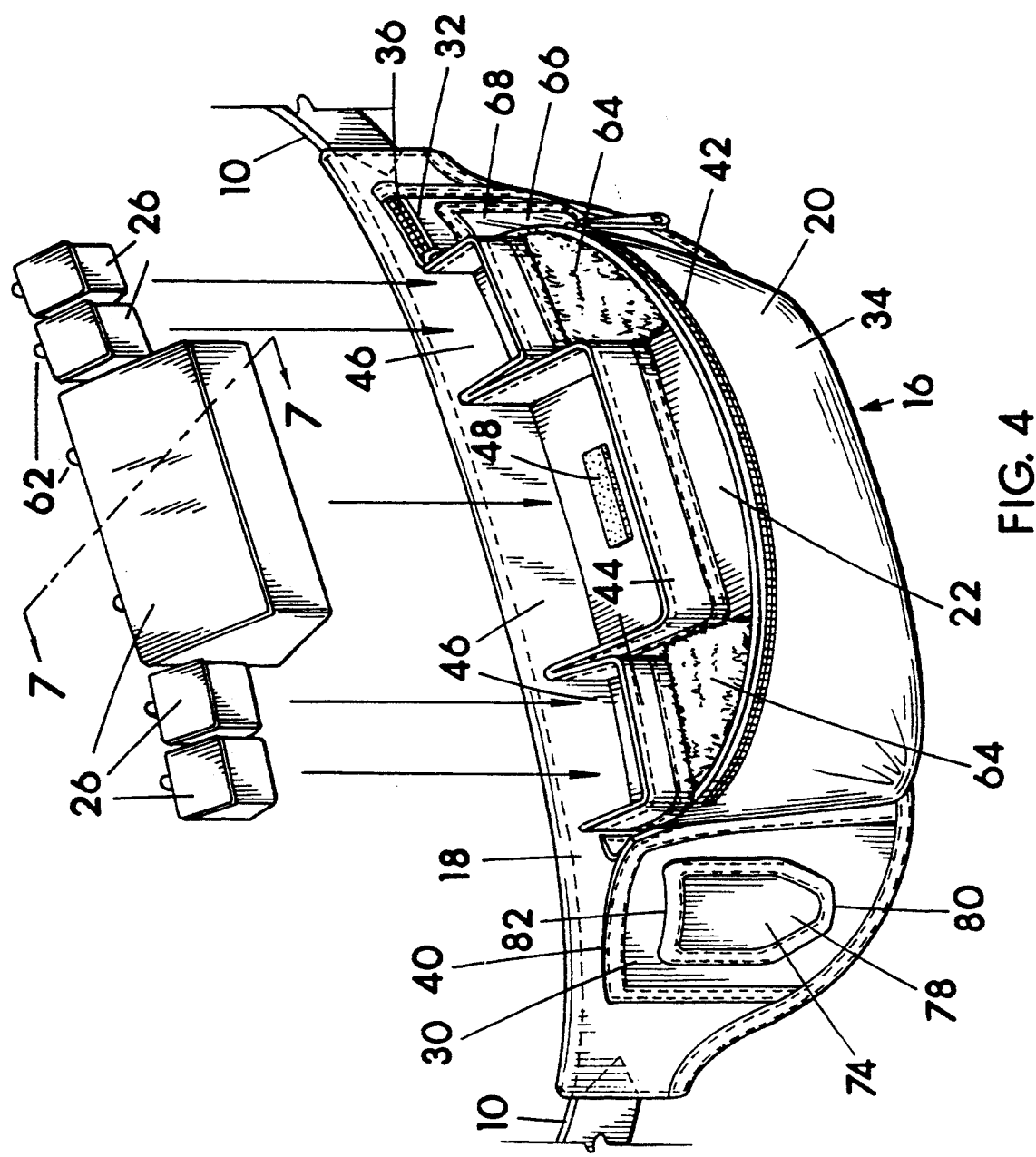
FIG. 4 is a top perspective view of the pack illustrating the rigid containers positioned above and ready for insertion into the upper compartments of the pack.
Figure 5:
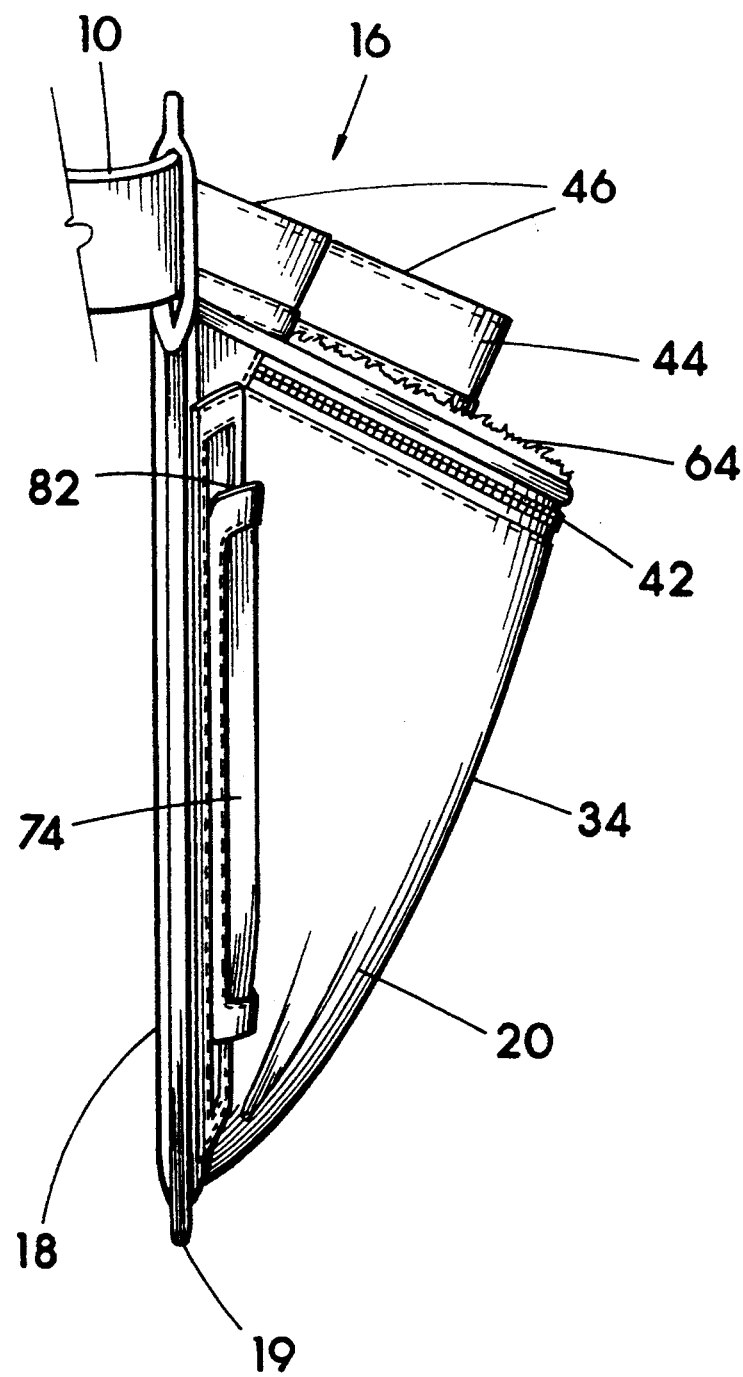
FIG. 5 is a right side view of the pack.
Figure 6:
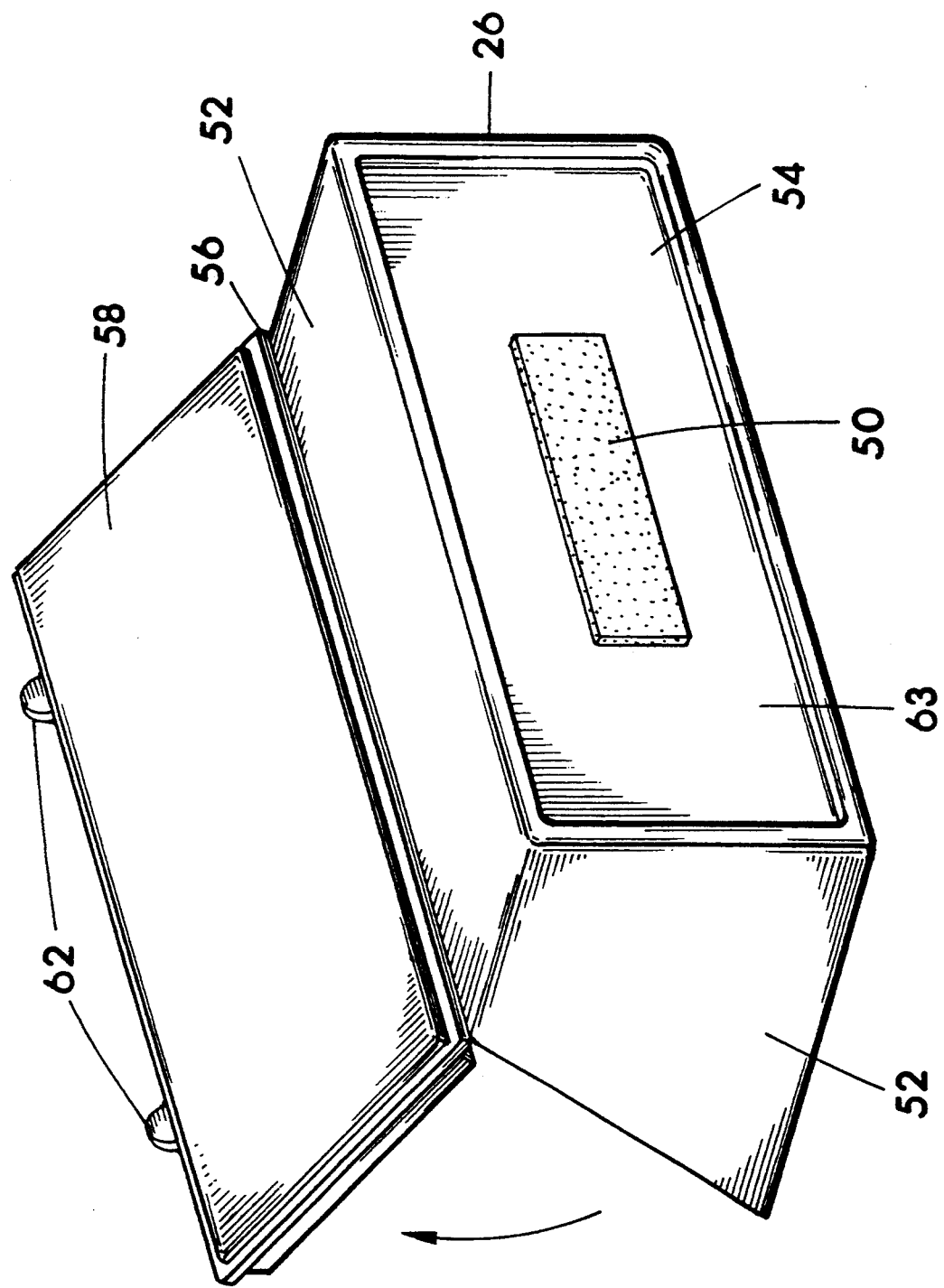
FIG. 6 is a bottom perspective view of one of the rigid containers showing one of the sloped side walls; the hook and loop fastener member on the bottom; and the lid in the opened position.
Figure 7:
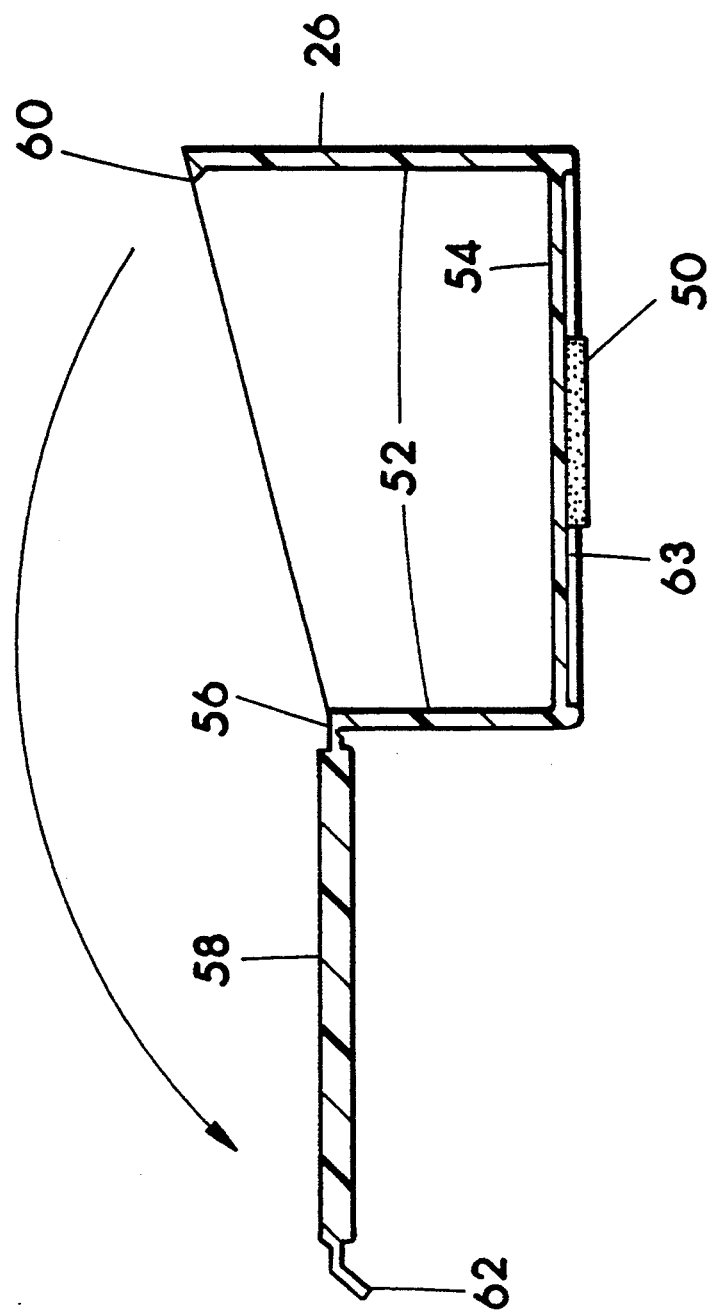
FIG. 7 is a cross sectional view of one of the rigid containers taken at cut line 7 of FIG. 4.

Referring now to the drawings in general where a preferred embodiment of the present invention is illustrated for example. A fishing tackle waist belt in general accordance with the present invention comprises a flexible belt 10 sized for placement around a human waist. Belt 10 may be made of nylon webbing, leather or other suitable flexible materials, and preferably includes mating snap fasteners 12 at the two free ends thereof as shown in FIG. 1. The snap fasteners 12 are preferably quick release types which are secure when connected to one another, yet quick to disconnect, and could also be hook and loop type fasteners or a more conventional buckle type fastening arrangement. There should be some arrangement within the belt 10 and belt fastener arrangement to allow the adjusting of the diameter of the belt so it can be adjusted to properly fit the waist size of numerous individuals having varying waist diameters, and in FIG. 1 one free end of belt 10 is shown looped through the eye of one snap fastener 12 component and then secured in place with a snug fitting band 14, an arrangement which allows the amount of belt 10 through the fastener eye to be adjusted to adjust the diameter of belt 10 around the wearer's waist.

Supported by belt 10 is a fabric pack 16 generally comprising sewn flexible fabric material such as nylon or similar rugged and flexible material such as a nylon pack cloth, which may be shaped by sewing. The fabric material of pack 16 is preferably water repellant. Pack 16 may be directly attached to belt 10 with sewing as indicated in the drawings, or the back top edge of pack 16 may include affixed belt loops through which belt 10 is threaded. Pack 16 is essentially an elongated sac or bag mainly constructed of sewn fabric, and is positioned lengthwise oriented relative to belt 10, or horizontally lengthwise oriented in use as shown in FIG. 1, and in use pack 16 is positioned directly in front of the wearer's waist. Pack 16 includes a back panel 18 and a front panel 20 connected to back panel 18 along a bottom edge seam 19 of pack 16, and connected to back panel 18 along two oppositely disposed side edges, which is essentially a continuation of seam 19. Back panel 18 is preferably a double fabric envelope filled with padding such as flexible foam for increased comfort, since the back surface of back panel 18 fits against the wearer in use, and when it is soft and pliable, back panel 18 and the balance of pack 16 somewhat form fits the wearer. The front panel 20 may be a single layer of fabric. Pack 16 additionally includes a top panel 22 extending from its attachment to back panel 18 outward generally horizontally but at a slight downward slope to essentially connect to front panel 20, the connection being primarily by a zipper as will be described. Top panel 22 is also preferably a double fabric layer having padding 24 therein, with the padding being primarily for the purpose of stiffening the top panel 22 for reasons of assisting in maintaining pack 16 in a desired shape, and for providing a relatively stiff surface onto which the rigid containers 26 rest as will be better appreciated with continued reading. Pack 16 includes vertically oriented dividing seams 28, one seam 28 toward each of the oppositely disposed ends within the pack to define two interior compartments; right hand compartment 30 and left hand compartment 32 toward the lengthwise ends of the pack 16. The dividing seams 28 are attached to the interior surface of back panel 18 and connect to the interior of front panel 20. Dividing seams 28 are simply the bringing together of front panel 20 and back panel 18 and sewing them together, with the leaving of loose or extra material of front panel 20 on each side of the sewn area to define a usable storage area. The left hand or side compartment 32 is accessible through an opening 36 which is preferably closable with an affixed zipper 38 or possibly a hook and loop fastener closure. The right hand compartment 30 is accessible through an opening 40 which may be zippered or closable with hook and loop fasteners. The left and right hand compartments 30 and 32 are relatively small and are useful for storing items such as wallets, keys, spools of line and the like.

Directly beneath top panel 22, which in the example of the invention shown in the drawings does not extend sideways so far as to extend over compartments 30 and 32, is a relatively large main compartment 34 which is accessible through a zippered opening 42, with the zipper actually being the connector between the front or forward edge of top panel 22 and the top edge of front panel 20. Main compartment 34 is substantially large, and is useful for carrying items such as snacks, a can of beverage, an extra reel or spool of line, a lunch, or a tee shirt and the like if desired.

Back panel preferably extends upward beyond top panel 22, for example, maybe about 2 inches, so as to define the back side of the container storage compartments 46. Further defined by relatively stiff, short fabric walls 44 connected to back panel 18 and to the upper surface of top panel 22 are the plurality of container storage compartments 46, with the top or upper areas of the container storage compartments 46 being left open in order to receive rigid containers 26. Placed within the container storage compartments 46 are a number of generally rigid containers 26 fitted removably within the container storage compartments 46. The container storage compartments 46 are left open at the tops to receive the rigid containers 26, and the rigid container storage compartments 46 include a bottom defined by the upper surface of top panel 22 on which the rigid containers 26 rest. Affixed within the container storage compartments 46, to the bottoms thereof, which is actually the upper surface of top panel 22, is a first portion of hook and loop fastener 48, positioned to mate with a mating or second portion of hook and loop fastener 50 glued to the bottom of the rigid containers 26, with this providing an arrangement to retain the rigid containers 26 within container storage compartments 46 in a manner which allows the intentional removal of the rigid containers 26, but prevents them from simply falling out. I have considered that one large container storage compartment 46 absent the dividers therebetween might work with one large or even multiple smaller rigid containers 26, however the dividers seem to maintain the containers 26 better located, particularly when one container 26 is removed from pack 16.

Each of the rigid containers 26 is generally comprised of four connected walls 52 or panels, which are positioned vertically oriented in use, and with a horizontal bottom panel 54 connecting between the walls 52 so as to define a rectangular box. In the example of the invention shown in the drawings, a large container storage compartment 46 is shown centrally on the top of pack 16, and a smaller container storage compartment 46 is shown on each oppositely disposed side of the central large container storage compartment 46. The central large container storage compartment 46 is sized and shaped to receive, in a snug manner, the single relatively large rigid container 26. In the example shown in the drawings, the two relatively small side container storage compartments 46, one on each opposite side of the large compartment 46, are for receiving in a snug manner, two small rigid containers 26 per each small side container storage compartments 46. The wall 52 of the rigid containers 26 closest to belt 10 is the highest or longest wall, the two oppositely disposed walls 52 extending outward generally perpendicular from belt 10 are sloped downward in their outward progression, and connect to the outer most wall 52 from belt 10 which is essentially the shortest or front wall 52 and generally parallels belt 10 so that the rigid containers 26 each have a sloped top surface with the slope being downward and outward away from belt 10 and the wearer of the belt 10. This sloping arrangement has been found to provide for easier viewing into the containers 26, and for easier access into the containers with the fingers, essentially by providing clearance for a bent finger, and primarily the finger knuckle when reaching into one of the containers to acquire an item. The lowest or shortest wall 52 (front wall) of each rigid container 26 includes a hinge 56 connected to the upper edge thereof, with the hinge 56 also being connected to a lid 58. Hinge 56 is preferably a living hinge, as rigid containers 26 are preferably boxes made of plastics which are generally rigid but still posses a degree of flexibility, and therefore the containers 26, hinges 56 and lids 58 may be all integrally formed economically within plastics injection molding out of polyethylene or other suitable plastics. Each of the lids 58 is structured to function in conjunction with the upper top edge of the container 26 to frictionally engage or snap fit to, and latch with a slight inward extension 60 on one of the walls 52 of the container 26 in the shut position. The top surface of the lids 58 preferably includes a small pull tab 62 connected to and extending from the lid to serve as a handle to grasp between two fingers to pull the lid into the open position. The tabs 62 are attached to the oppositely disposed side of the lids 58 from hinges 56, or near the wearer. The larger central rigid container 26 preferably includes two spaced apart pull tabs 62, for either left hand or right hand access. The lids 58 swing outward away from belt 10 when being moved into the open position in order to provide improved viewing and access in the containers 26. The hinge 56 of each container 26 is preferably formed to provide resistance, based on the shape of the plastics in and around the hinge 56, to the lids 58 moving beyond about horizontal in the open position so that the lid 58 in an open position will in effect serve somewhat as an item tray, and serve to catch small items which may be dropped when being pulled from a container 26. The bottom exterior of each rigid container 26 preferably includes a small recess 63 into which a portion of hook and loop fastener 50 is glued, with the recess 63 being sufficiently shallow to allow the fastener 50 to mate with the mating fastener 48 within the bottom of container storage compartments 46. The walls 44 defining container storage compartments 46 are of an elevational extension upward above the upper surface of top panel 22 so that when rigid containers 26 are positioned in compartments 46, the lids 58 of the containers 26 are exposed and visible. As previously stated, the top or upper exposed surface of each lid 58 is preferably marked for specific items such as hooks, lures, swivels, and weights for example, which may be contained in the individual designated compartments for quick and easy access thereto, as may be seen in FIG. 1. Such markings 59 on the lids 58 may be embossed into the lids, or may be stickers or the like which would allow the fisherman to label his container lids 58 according to his items which he chooses to carry. The interior of the larger central rigid container 26 may include dividers, whether permanently affixed or removably affixed, and it may also include small raised ribs on the interior bottom panel which serve to support rubber worms raised from the bottom panel, as many rubber worms have an adverse chemical effect on other plastics, and the raised ribs prevent or reduce the rubber of the worms from chemically attacking the plastics of the rigid container 26.

As may be seen in FIG. 1, some of the upper surface of top panel 22 is left exposed outside the boundaries of walls 44 of container storage compartments 46, and this provides a good area to which to affix by sewing or gluing a woolly or fabric material 64, preferably similar to sheep wool for inserting the hooks of flies or lures if desired, either momentarily or for an extended period of time while fishing.

Affixed by sewing or any other suitable arrangement to the front exposed surface of front panel 20, is a sleeve or pocket 66 for retaining and displaying a fishing license or similar document. The pocket 66 is made of clear or transparent material 68, such as vinyl or the like plastics, preferably having a fabric or leather outer framing 70 for added strength which is sewn to the outer front surface of front panel 20 along the bottom and the two oppositely disposed side edges to leave the top edge unattached and therefore open at 72 to allow insertion and removal of a fishing license. The fishing license when within pocket 66 is clearly visible through the clear window material 68 and is positioned about waist height.

Preferably, also on the exterior of front panel 20 is an exterior pocket 74 for holding a hand tool for removing a hook from the mouth of a fish or for cutting fishing line, such as a pair of pliers 76. The tool pocket 74 is made of flexible fabric material 78, preferably having a fabric or leather outer framing 80 for added strength which is sewn to the outer front surface of front panel 20 partly along the bottom and fully along the two oppositely disposed side edges to leave the top edge unattached and therefore open at 82 to allow insertion and removal of the tool 76. The bottom of the tool pocket 74 as shown in the drawings is left open for a narrow distance to allow the nose of the pliers 76 or like tool to extend partly out the bottom.

Although I have very specifically described the preferred structures of the invention, it should be understood that the specific details are just that, "preferred" structures given for example to those skilled in the art. Many changes in the specific structures described may clearly be made without departing from the scope of the invention, and therefore the scope of the invention is not to be overly limited by the specification and drawings given for example, but should be determined by the spirit and scope of the appended claims.

What I claim as my invention is:

1. A fishing tackle waist belt for holding fishing items, comprising;

a flexible belt sized for placement around a human waist, connecting means on said belt for affixing the belt around a human waist, a flexible fabric pack supported by said belt, at least one container storage compartment defined by flexible fabric in connection with an exterior top portion of said fabric pack, said container storage compartment having side walls, a bottom panel defined by said exterior top portion of said pack and an open top, at least one generally rigid container having a moveable lid thereon respectively positioned within said at least one container storage compartment, said rigid container at least in part stabilized by said side walls and said bottom panel of said container storage compartment, said movable top lid of said rigid container exposed at said open top of said container storage compartment for allowing unobstructed access and viewing to said top lid and into said rigid container, said top lid of said rigid container hingidly attached to said container by means of a hinge wherein the hinge is placed on far sides of the rigid container away from said belt so that said top lid is arranged to be openable outward away from said belt for providing ready access and viewing into the rigid container, fastening means for removably securing said rigid container within said container storage compartment for preventing the rigid container from falling out of the open top of said container storage compartment, said fastening means, at least in part, affixed to said bottom panel and securing said rigid container within said open top of said container storage compartment in a manner allowing said top lid of said rigid container to be moved to an open position while said fastening means retains said rigid container within said container storage compartment.

2. A fishing tackle waist belt for holding fishing items, comprising;

a flexible belt sized for placement around a human waist, connecting means on said belt for affixing the belt around a human waist, a flexible fabric pack supported by said belt, a plurality of container storage compartments in connection with an exterior top portion of said fabric pack, said container storage compartments having side walls, bottom panels defined by said exterior top portion of said pack and open tops, a number of generally rigid containers respectively fitted removably within said container storage compartments, said rigid containers each having hingidly attached top lids attached thereto by means of a hinge wherein the hinges are placed on far sides of the rigid containers away from said belt so that said lids are arranged to be openable outward away from said belt for providing ready access and viewing into the rigid containers, said top lids of said rigid containers being exposed through said open tops of said container storage compartments so as to provide unobstructed access and viewing to the top lids and into said rigid containers while wearing said fishing tackle waist belt, means for releasably retaining said rigid containers within said container storage compartments so as to prevent the rigid containers from falling out of the container storage compartment, at least one item storage compartment within said fabric pack underneath said containers, and accessible through an exterior of said fabric pack, means affixed on an exposed area of said fabric pack for retaining a fishing license with said means for retaining being at least in part transparent for displaying of a retained fishing license.

3. A fishing tackle waist belt for holding fishing items, comprising;

a flexible belt sized for placement around a human waist, connecting means on said belt for affixing the belt around a human waist, a flexible fabric pack supported by said belt, a plurality of container storage compartments in connection with an exterior top portion of said fabric pack defined by flexible fabric of said fabric pack and including side walls and bottom panels defined by said exterior top portion of said pack defining the container storage compartments, said container storage compartments having open tops, a number of generally rigid containers respectively fitted removably within said container storage compartments, top side edges of said rigid containers sloping downward and outward toward a far side of said containers and away from said belt so as to provide a sloping top surface on each of the rigid containers for providing ready access into the containers while wearing the fishing tackle waist belt, said rigid containers each having hingidly attached top lids with the hinges placed on the bar sides of the rigid containers away from said belt so that said lids are arranged to be openable outward away from said belt for providing ready access and viewing into the rigid containers said top lids of said rigid containers exposed through the open tops of said container storage compartments to allow unobstructed access and viewing to the top lids while wearing said fishing tackle waist belt, means for releasably retaining said rigid containers within said container storage compartments including hook and loop fasteners respectively connected to bottoms of said rigid containers and said bottom panels of said container storage compartments, at least one item storage compartment in said fabric pack underneath said container storage compartments and accessible through an exterior of said fabric pack, means affixed on an exposed area of said fabric pack for retaining a fishing license with said means for retaining being at least in part transparent for displaying of a retained fishing license, means affixed on an exposed area of the front exterior of said fabric pack for retaining a hand tool in a readily accessible and removable manner.

* * * * *